United States Patent [19]
Matterazzo et al.

[11] Patent Number: 5,474,044
[45] Date of Patent: Dec. 12, 1995

[54] SELECTIVE SWIRL INDUCING DEVICE FOR A COMBUSTION CHAMBER

[75] Inventors: John P. Matterazzo, Warren; Larry G. Martindale, II, Royal Oak, both of Mich.

[73] Assignee: Chrysler Corporation, Highland Park, Mich.

[21] Appl. No.: 316,770

[22] Filed: Oct. 3, 1994

[51] Int. Cl.⁶ .................................................. F02B 23/08
[52] U.S. Cl. ................................................................ 123/306
[58] Field of Search .................................. 123/306–309, 123/48 R

[56] References Cited

U.S. PATENT DOCUMENTS

| | | | |
|---|---|---|---|
| 2,920,613 | 1/1960 | Vogel et al. | 123/188.14 |
| 3,868,940 | 3/1975 | Kirchweger | 123/188.14 |
| 4,015,577 | 4/1977 | Elsbett et al. | 123/188.14 |
| 4,320,725 | 3/1982 | Rychlik et al. | 123/188.14 |
| 4,513,709 | 4/1985 | Stace | 123/306 |
| 4,844,040 | 7/1989 | Leighton et al. | 123/306 |

FOREIGN PATENT DOCUMENTS 6-33805  2/1994  Japan .

Primary Examiner—Andrew M. Dolinar
Attorney, Agent, or Firm—Kenneth H. MacLean

[57] ABSTRACT

In a combustion chamber of an internal combustion engine, a selectively activated device positioned adjacent the intake port and having a first non-swirl inducing operative position and a second swirl inducing operative position is provided. In the first operative position, a wall of the device is substantially planar with the wall of the cylinder head forming the combustion chamber. In the second operative position, the device pivots to move the wall outward in a non-planar relationship to the cylinder head wall to form a ramp-like surface causing fluid flow from the inlet port into a circular swirling motion in the combustion chamber.

5 Claims, 1 Drawing Sheet

SELECTIVE SWIRL INDUCING DEVICE FOR A COMBUSTION CHAMBER

BACKGROUND OF THE INVENTION

1. Field of the Invention

This invention relates to a selectively pivotal device mounted in a cylinder head of an internal combustion engine in the combustion chamber which in a first inactive position is retracted so that a wall is flush or planar with the adjacent wall surface of the combustion chamber so as not to effect fluid flow into the combustion chamber from the inlet port. When the device is pivoted to a second active operative position, the wall surface of the device is moved to form a ramp-like structure which tends to cause the fluid from the inlet port to move in a circular or swirling motion in the combustion chamber.

2. Description of Related Art

The pre-examination search of the subject device uncovered the following prior references.

U.S. Pat. No. 2,920,613 issued to Vogel et al., discloses a rotative swirl device positioned at the inlet of the inlet passage upstream from the inlet valve.

U.S. Pat. Nos. 3,868,940; 4,015,577; and 4,844,040 issued to Kirchweger; Elsbett et al.; and Leighton et al., respectively, disclose rotative swirl devices positioned upstream from the inlet valve to selectively form one or two separate paths to the valve and into the combustion chamber.

U.S. Pat. No. 4,320,725 issued to Rychlik et al., discloses a multi-walled fluid directing device on an inlet valve and a rotatable device further upstream cooperative with the multi-walled device.

After reading the detailed description of this application, it will be appreciated that specific features of the subject swirl inducing device in the combustion chamber is not suggested by any of the above described prior reference or any other prior art known to the applicant.

SUMMARY OF THE INVENTION

This invention is directed to a new device for the cylinder head of an internal combustion engine for selectively providing either a tumble type flow pattern or a swirl type flow pattern for air flowing in the combustion chamber.

Also, the subject device is easily actuated to selectively move between two operative positions by a simple mechanical control device.

Other features and advantages will become more apparent from the following:

DETAILED DESCRIPTION OF AN EMBODIMENT

Figure 1:
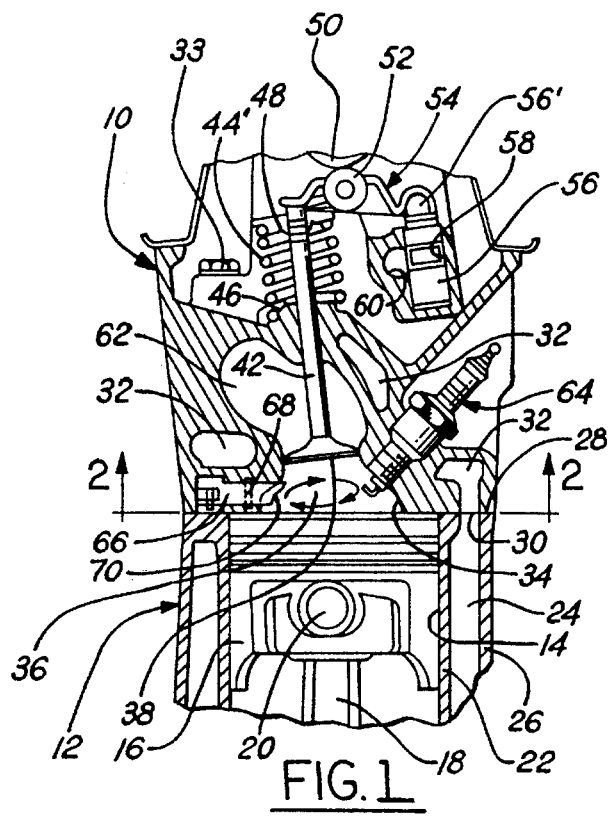
FIG. 1 is a sectional elevational view of a cylinder head and part of the engine block taken through a cylinder bore along Section Line 1—1 in FIG. 2 and looking in the direction of the arrows.

FIGS. 1–4 reveal cross-sectional views of part of a cylinder head 10 and an engine block 12 of an internal combustion engine. The engine block 12 has at least one cylinder bore 14 in which a piston 16 is reciprocally supported. Piston 16 is connected to the upper end of a connecting rod 18 by a wrist or piston pin 20. The cylinder bore 14 is formed by an inner wall 22 which also forms part of an internal coolant pocket or flow passage 24. An outer wall 26 completes the enclosure of the passage 24 which is for cooling the block.

Figure 4:
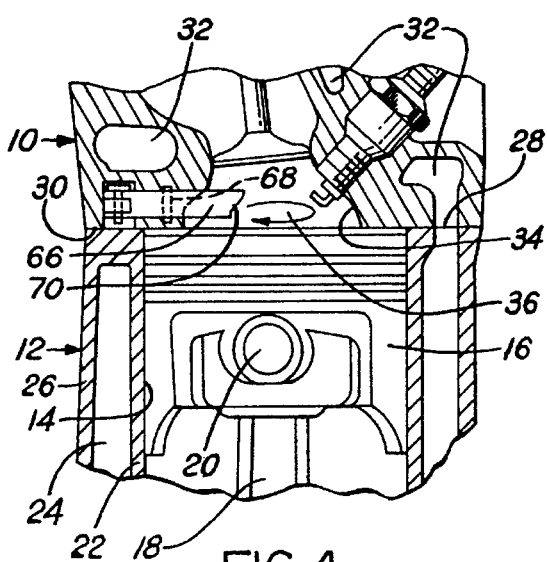
FIG. 4 is a view similar to FIG. 1 but with the subject device in its active, swirl inducing operative position.

A top or upper surface 28 of the block 12 is flat for mating with a lower surface 30 of the cylinder head 10. Cylinder head 10 also has coolant passages 32 therein which are connected to coolant passages 24 in the block 12 past the mating surfaces 28 and 30 as shown in FIGS. 1 and 4. Cylinder head 10 is firmly attached to block 12 by a plurality of head bolts 33, only one of which is visible in FIG. 1. A wall 34 of head 10 defines a space which overlies the upper end of the cylinder bore 14 to define, with piston 16, a combustion chamber 36.

Figure 2:
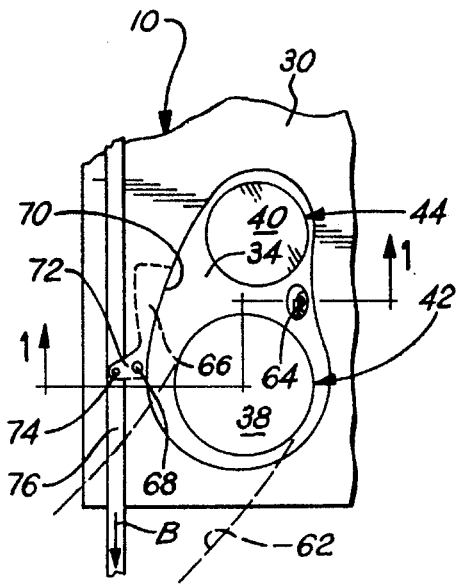
FIG. 2 is a sectional view taken along Section Line 2—2 in FIG. 1 and looking in the direction of the arrows.
Figure 3:
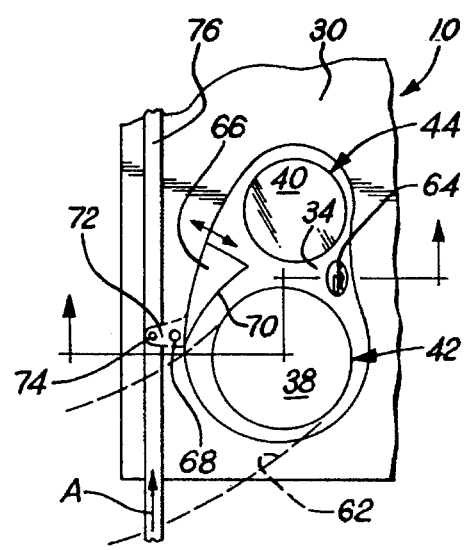
FIG. 3 is a view similar to FIG. 2 but with the subject device in its active, swirl inducing operative position.

FIGS. 2 and 3 illustrate the lower surface 30 of the cylinder head 10 and also reveals the lower faces 38, 40 of the enlarged portion of the intake and exhaust valves 42, 44, respectively. In FIG. 1, the intake valve 42 is shown in side view which reveals that the valves are of the commonly used poppet type. In FIG. 1, a valve spring 44' is shown extending between a surface 46 of the head 10 and a valve spring retainer 48. Valve spring 44' urges the valve toward its closed operative position shown in FIG. 1. In the closed position, the enlarged head portion of the valve 42 engages a seat portion formed in the cylinder head 10 as shown. The construction of the exhaust valve 44 and its seat is similar.

The valve 42 is moved from its closed operative position to a more opened position by rotation of a cam lobe 50 as is conventional in the engine art. Specifically, the cam lobe 50 engages a roller 52 mounted upon a rocker arm 54. The leftward end of the rocker arm 54 engages the upper end of the valve 42. The leftward end of rocker arm 54 engages a hydraulic (oil) lash adjuster 56. Specifically, the rocker arm is pivotally supported upon an upper end 56' of lash adjuster 56. The lash adjuster 56 is mounted in a cavity 58 in cylinder head 10 and receives pressurized oil through a feed conduit or oil line 60 formed in the cylinder head 10. The pressurized oil tends to causes the lash adjuster to axially expand to form a solid and stable pivot for the rocker arm 54. This axial extension takes up any slight gap between the roller and the cam lobe.

When the camshaft is rotated and lobe portion 50 moves past the roller 52, a force is exerted upon roller 50 causing the rocker arm to pivot about the end 56' of the lash adjuster 56. This in turn moves the valve 42 downward toward a more opened position against the force of the spring 44.

When the intake valve 42 opens, air is drawn into the combustion chamber 36 from an inlet passage 62 formed in the cylinder head 10. A downward movement of piston 16 increases the volume of the combustion chamber 36 to cause this flow. Specifically, the orientation of the intake passage relative to the combustion chamber 36 causes the flow into the expanding combustion chamber into a tumble pattern as shown in FIG. 1. The tumble pattern is substantially circular movement about a center or axis which is substantially normal to the axis of the cylinder bore 14 and the direction of piston movement. Tumble flow is desirable to promote good combustion during non-idling operation of an engine.

Note that a spark plug 64 is threadably received by the cylinder head 10 and serves to ignite an fluid or air/fuel mixture.

The normal vertical tumble flow associated with FIG. 1 is not as effective for combustion as a generally horizontal swirling flow as illustrated in FIG. 4. Specifically, the swirl type pattern is characterized by circular movement of fluid about an axis generally parallel to the axis of the cylinder bore 14 and is particularly desirable for good combustion characteristics at idle or relatively slow engine rotation. The cylinder head 10 includes means to selectively change the flow from a tumble pattern to a swirl pattern. The swirl flow pattern is produced by pivoting a flow directing device or gate 66 into the combustion chamber 36. Gate 66 is positioned adjacent the intake valve 42 at the exit of the inlet passage 62. It is located above the piston 16 so as not to interfere with movement thereof. The gate 66 pivots clockwise about a pin 68 as shown between views 2 and 3. This causes an inclined or ramp-like surface 70 to be extended into the combustion chamber 36. Air flow from the inlet passage 62 passes intake valve 42 and then engages the ramp surface 70. Resultantly, a circular swirling movement in a generally horizontal plane is imparted to the air. Needless to say, the gate device 66 is very closely fitted into a corresponding pocket in the cylinder head.

The position of the gate device 66 is controlled by means of a small pivot arm 72 extending from the vicinity of pin 68. Arm 72 acts as a lever to move the device when activated from its normal position shown in FIG. 2. A fastener 74 connects arm 72 to a longitudinally extending actuator rod 76. When a swirl type flow pattern is selected and desired, the rod 76 is moved in direction A from its position shown in FIG. 2 to the position shown in FIG. 3. Alternately, for selecting a tumble type flow pattern, the rod 76 is moved in direction B from its position shown in FIG. 3 to the position shown in FIG. 2.

While a preferred embodiment of the subject selectively actuated swirl inducing device has been illustrated and described, other embodiments will now become apparent to those skilled in the art and thus the invention is not necessarily limited to what is illustrated and described but by the following claims.

What is claimed is:

1. For an internal combustion engine with a cylinder head defining a fluid flow from an intake passage into a combustion chamber and past an intake valve, a selectively actuated device to change flow in the combustion chamber between a generally vertical tumble pattern and a generally horizontal swirl pattern, comprising: an elongated gate with a ramp-like surface; means for mounting said gate to the cylinder head at a position downstream from the intake valve for allowing pivotal movement of said gate, whereby when pivoted into one operative position, the ramp-like surface is substantially coplanar with the wall of the combustion chamber so that flow therepast is not effected and alternately when pivoted into another operative position, the ramp-like surface moves outwardly from the wall of the combustion chamber so that the ramp-like surface diverts fluid flow into a generally horizontal swirl pattern.

2. In an internal combustion engine having a piston reciprocally supported in a cylinder bore; a cylinder head assembly with wall means for defining a combustion chamber along with said cylinder bore and said piston; an air intake passage formed in said cylinder head and leading into said combustion chamber; an intake valve with a closed and an opened operative position to control air flow from said intake passage into said combustion chamber whereby the orientation of said intake passage is such that air flow into said combustion chamber normally forms a tumble flow pattern characterized by circular motion in the cylinder and combustion chamber substantially about a horizontal axis; a pivotal gate downstream from said intake valve having a ramp-like surface which is generally coplanar with the wall of the combustion chamber during tumble flow of air in the combustion chamber; means to selectively pivot said gate to move said ramp-like surface away from the wall of the combustion chamber and into the flow of air thereby causing the air flow to assume a swirling flow pattern characterized by circular motion about a substantially vertical axis.

3. The selective flow altering device set forth in claim 2 further comprising: a control rod longitudinally supported in said cylinder head and capable of selective axial movements; an offset arm portion of said gate; a pin attaching said offset arm of said gate to said control rod for transforming axial movement of said control rod into pivotal movement of said gate whereby said gate pivots between a normal tumble producing position and an alternate swirl flow producing position.

4. The selective flow altering device set forth in claim 2 in which a pocket is formed in said cylinder head for receiving said gate and is configured so that the edge portions of the pocket and of said gate are closely fitted while allowing relative displacement therebetween.

5. The selective flow altering device set forth in claim 4 in which said pocket is wholly in the cylinder head and thus said gate is always positioned and spaced upward from the uppermost position of said piston in said cylinder bore.

\* \* \* \* \*